United States Patent [19]
Goltsov et al.

[11] 3,804,616
[45] Apr. 16, 1974

[54] ALLOY ON THE BASIS OF PALLADIUM FOR THE MANUFACTURE OF FILTERING ELEMENTS USED IN PREPARATION OF HYDROGEN OF SUPER-HIGH PURITY

[76] Inventors: Viktor Alexeevich Goltsov, ulitsa Belinskogo, 8/10, kv. 7; Pavel Vladimirovich Geld, ulitsa Mira, 36, kv. 78; Genrikh Efimovich Kagan, ulitsa Komosomolskaya, 50, kv. 77; Nikolai Ivanovich Timofeev, prospekt Lenina, 62, korpus 5, kv. 17; Ivan Filippovich Belyaev, ulitsa Malysheva, 7, kv. 8; Viktor Alexandrovich Mitjushov, ulitsa Moskovskaya, 49, kv. 67; Saule Khuryatbekovna Kurumchina, pereulok Vstrechny, 7, korpus 1, kv. 44, all of Sverdlovsk, U.S.S.R.

[22] Filed: Jan. 8, 1973

[21] Appl. No.: 322,190

[52] U.S. Cl................... 75/172 G, 55/16, 75/134 N
[51] Int. Cl.............................................. C22c 5/00
[58] Field of Search.......... 75/172 G, 172 R, 134 N; 55/16

[56] References Cited
UNITED STATES PATENTS

| | | | |
|---|---|---|---|
| 2,824,359 | 2/1958 | Rhodes........................ | 75/172 G X |
| 3,155,467 | 11/1964 | Yamamoto et al..................... | 55/16 |
| 3,172,742 | 3/1965 | Rubin..................................... | 55/16 |

FOREIGN PATENTS OR APPLICATIONS

| | | | |
|---|---|---|---|
| 250,457 | 8/1969 | U.S.S.R............................ | 75/172 G |
| 15,455 | 9/1962 | Japan................................ | 75/172 G |
| 15,456 | 9/1962 | Japan................................ | 75/172 G |

*Primary Examiner*—Hyland Bizot
*Assistant Examiner*—E. L. Weise
*Attorney, Agent, or Firm*—Holman & Stern

[57] ABSTRACT

An alloy on the basis of palladium for the manufacture of filtering elements used in the preparation of super-high purity hydrogen by diffusion purification of technical hydrogen or isolation of hydrogen from hydrogen-containing gaseous mixtures, consisting of palladium (43–89 per cent by weight), silver (10–26 per cent by weight), gold (1–26 per cent by weight), ruthenium (0.1–0.9 per cent by weight), aluminium (0.1–2.0 per cent by weight), and platinum (0.1–2.5 per cent by weight).

The proposed alloy has increased permeability toward hydrogen in combination with high mechanical stability during operation in hydrogen medium.

2 Claims, No Drawings

ALLOY ON THE BASIS OF PALLADIUM FOR THE MANUFACTURE OF FILTERING ELEMENTS USED IN PREPARATION OF HYDROGEN OF SUPER-HIGH PURITY

The invention relates to alloys on the basis of palladium used in the manufacture of filtering elements employed for preparation of super-high purity hydrogen by the method of diffusion purification of technical hydrogen or isolation of hydrogen from a hydrogen-containing gaseous mixture.

Hydrogen of super-high purity is used in many branches of industry, in particular in semiconductor, electrovacuum, chemical, metallurgical and other industries. The above mentioned alloys are employed in the preparation of super-high purity hydrogen owing to their high permeability toward hydrogen.

Alloys are known on the basis of palladium used in the manufacture of filtering elements employed for preparation of super-high purity hydrogen by the method of diffusion purification of technical hydrogen or isolation of hydrogen from hydrogen-containing gaseous mixtures. The alloys consist of palladium (from 65 to 90 per cent by weight) and alloyed with silver (from 20 to 30 per cent by weight), gold (from 5 to 25 per cent by weight) and ruthenium or rhodium (from 2 to per cent by weight), (see patent of Japan Pat. No. 408,573, cl.10k4, 9ec. 2,984,1963); or alloyed with silver (from 25 to 40 per cent by weight) and nickel (from 5 to 10 per cent by weight), (see Inventor's Certificate of the USSR No. 182,698 cl.12i 1/32).

The known alloys are either insufficiently permeable for hydrogen or inadequately strong from the point of view of their mechanical properties. These disadvantages reduce the productivity of the hydrogen purifying units and their service life.

The object of this invention is to work out an alloy on the basis of palladium for the manufacture of filtering elements for hydrogen which would possess higher hydrogen permeability in combination with high mechanical strength when operated in the medium of hydrogen.

In accordance with this and other objects, the invention consists in that a new alloy is proposed consisting of palladium, silver, gold, ruthenium, aluminium and platinum.

The constituents are taken in the following proportion (in per cent by weight): palladium, 43 – 89, silver, 10 – 26, gold, 1 – 26, ruthenium, 0.1 – 0.9, aluminium, 0.1 – 2.0, and platinum, 0.1 – 2.5.

It is recommended to use the alloy which consists of the following components taken in per cent by weight: - palladium, 66 – 83, silver, 15 – 23, gold, 1 – 8, ruthenium, 0.1 – 0.5, aluminium 0.2 – 1.0, and platinum, 0.5 – 1.5.

The proposed alloy possesses increased permeability toward hydrogen in combination with the high corrosion resistance and mechanical strength. These valuable properties have been obtained as a result of the optimum selection of the alloying elements and their quantitative proportions.

A brief substantiation of the selection of the alloying elements and their quantitative proportioning is given below.

It has been established that when silver is added to palladium, the permeability of the alloy toward hydrogen changes extremely attaining its maximum at a silver content of 15–26 per cent by weight. Further increase of the silver content reduces drastically the permeability of the material toward hydrogen.

Gold, as an alloying element, is in a measure analogous to silver. However, unlike silver it reduces the hydrogen permeability. The positive effect of the gold addtion is a marked imporvement in resistance to corrosion and surface deterioration poisoning of the alloy.

Ruthenium is an elements which supplies strength to the alloy on the basis of palladium. But when added in great quantities it reduces significantly the hydrogen-permeability of the alloy.

Aluminum has been used as an addition to the alloy on the basis of palladium for the first time. It improves both mechanical and diffusion charactertistics of the alloy. Its addition to palladium improves markedly the alloy, increases its mechanical stability and reduces friability under the effect of hydrogen. At the same time the permeability toward hydrogen is not deteriorated with the presence of this metal.

Unlike silver or gold, platinum reduces drastically the hydrogen permeability of the alloy. At the same time small quantities of this metal improve significantly the mechanical strength and corrosion resistance of the alloy (including resistance to poisoning of the alloy surfaces).

The proposed alloy can be obtained by the known methods, for example by smelting in an induction furnace in a shielding gas medium.

The alloy possesses high workability in forging and cold rolling. It can be rolled into foil and formed into tubes less than 0.1 mm thick. Its tensile strength is 38 kg/sq. mm, the relative elongation is 40 per cent.

As has already been said, the proposed alloy can be used for the preparation of super-high purity hydrogen by diffusion purification of technical hydrogen, for example electrolytic hydrogen, or isolation of hydrogen from various hydrogen-containing gaseous mixtures, for instance from a nitrogen-hydrogen mixture containing hydrogen to 75 per cent by volume, from the conversion products of hydrocarbons containing hydrogen to 40 – 60 per cent by volume, etc.

Foil of 0.1 mm thick and filtering elements of the alloy were tested for hydrogen permeability and mechanical strength in atmosphere of hydrogen.

The filtering elements made of the alloy were tested for hydrogen permeability in a diffusion purifying unit at a working temperature of 300°–500°C, at a pressure on the side of the original gaseous mixture from 1 to 300 atm and on the side of the pure hydrogen from $10^{-4}$ to 760 mm Hg.

Moreover, samples of foil made of the alloy were tested for mechanical strength by repeated heating from 20° to 500°C with subsequent cooling from 500° to 20°C. The properties of the samples were checked after each 50 cycles for the distortion of the initial shapes.

For a better understanding of the invention the following examples illustrating preparation of the proposed alloy and also its characteristics (hydrogen permeability and mechanical strength during operation in hydrogen medium) are given below.

EXAMPLE 1

An alloy of the following composition (in per cent by weight) was prepared:

| | |
|---|---|
| palladium | 88.7 |
| silver | 10 |
| gold | 1 |
| ruthenium | 0.1 |
| aluminium | 0.1 |
| platinum | 0.1 |

The alloy was smelted in an induction furnace in a medium of argon. Foil of 0.1 and 1.5 mm thick was then manufactured out of the alloy according to the known method (forging with subsequent cold rolling).

The alloy was tested for hydrogen permeability and mechanical strength according to the above described method.

The hydrogen permeability of the alloy was determined in a diffusion purifying unit wherein the filtering element was made of membrane 0.15 mm thick. The working temperature was 500°C. The pressure of technical hydrogen was 3 atm. The pressure of the side of the purified hydrogen was $10^{-4}$ mm Hg. The hydrogen permeability in these conditions was 8.2 cu.cm/sq. cm. x min.

The hydrogen permeability of the known alloy consisting of palladium (65 per cent by weight), silver (28 per cent by weight) gold (5 per cent by weight) and ruthenium (2 per cent by weight), tested in the same conditions, was 4.8 cu.cm/sq.cm $x$ min, that is 1.7 times less then the permeability of the proposed alloy.

Foil made of the proposed alloy withstood 900 heating-cooling cycles without appreciable deterioration of the initial shapes.

EXAMPLE 2

An alloy of the following composition (in per cent by weight) was prepared:

| | |
|---|---|
| palladium | 43.6 |
| silver | 26 |
| gold | 20 |
| ruthenium | 0.9 |
| aluminium | 2.0 |
| platinum | 2.5 |

The conditions for the manufacture of this alloy and its testing were the same as in the previous example.

The hydrogen permeability of the alloy was 6.8 cu.cm/sq. cm $x$ min, that is 1.4 times greater than the hydrogen permeability of the known alloy described in Example 1.

Foil manufactured of the proposed alloy withstood 1,100 heating-cooling cycles without noticeable deterioration of the initial shapes.

EXAMPLE 3

An alloy of the following composition (in per cent by weight) was prepared:

| | |
|---|---|
| palladium | 75 |
| silver | 20 |
| gold | 2.5 |
| ruthenium | 0.5 |
| aluminium | 1.0 |
| platinum | 1.0 |

The conditions for preparation of the alloy and its testing for hydrogen permeability and mechanical strength were the same as described in Example 1.

The hydrogen permeability of the alloy foil 0.1 mm thick determined in a diffusion purifying unit at a working temperature of 450°C. The test medium was a pure nitrogen-hydrogen gaseous mixture containing 75 per cent by volume of hydrogen. The pressure on the side of the gaseous mixture was 300 atm and that on the side of the pure hydrogen was 1 atm. The hydrogen permeability under these conditions was 123 cu.cm/sq. cm $x$ min., which is 1.55 fold greater than the hydrogen permeability of the known alloy consisting of palladium (84.5 per cent by weight), silver (10 per cent by weight) and nickel (5.5 per cent by weight) tested under the same conditions.

The foil manufactured of the proposed alloy withstood 1000 heating-cooling cycles without appreciable deterioration of the initial shapes.

We claim:

1. An alloy on the basis of palladium for the manufacture of filtering elements used in preparation of superhigh purity hydrogen by the diffusion purification of technical hydrogen or isolation of hydrogen from hydrogen-containing gaseous mixtures characterized in that it consists of 43 – 89 per cent by weight palladium, 10–26 per cent by weight silver, 1 – 26 per cent by weight gold, 0.1 – 0.9 per cent by weight ruthenium, 0.1 – 2.0 per cent by weight aluminium and 0.1 – 2.5 per cent by weight platinum.

2. An alloy according to claim 1, CHARACTERIZED IN THAT it consists of 66–83 per cent by weight palladium, 15–23 per cent by weight silver, 1–8 per cent by weight gold, 0.1–0.5 per cent by weight ruthenium, 0.2 – 1.0 per cent by weight aluminium and 0.5 – 1.5 per cent by weight platinum.

* * * * *